Oct. 26, 1943.  R. M. HEINTZ  2,333,007

CENTRIFUGAL CLUTCH

Filed March 11, 1942

INVENTOR.
RALPH M. HEINTZ
BY
Frank H. Harmon
ATTORNEY

Patented Oct. 26, 1943

2,333,007

UNITED STATES PATENT OFFICE 2,333,007

CENTRIFUGAL CLUTCH

Ralph M. Heintz, Cleveland, Ohio, assignor to Jack & Heintz, Inc., Cleveland, Ohio Application March 11, 1942, Serial No. 434,235

3 Claims. (Cl. 192—46)

This invention relates to an automatic clutch mechanism for establishing a driving connection between two shafts in response to rotation of one of the shafts.

The object of the invention is to provide an improved automatic clutch mechanism for rotating a driven shaft by means of a driving shaft and for preventing rotation of the driving shaft by the driven shaft.

Another object of the invention is to provide an automatic clutch mechanism responsive to centrifugal force upon rotation of a driving shaft to connect the driving shaft with a driven shaft for a predetermined direction of rotation.

For a better understanding of the invention reference will be made to the accompanying drawing in which.

Figure 1:
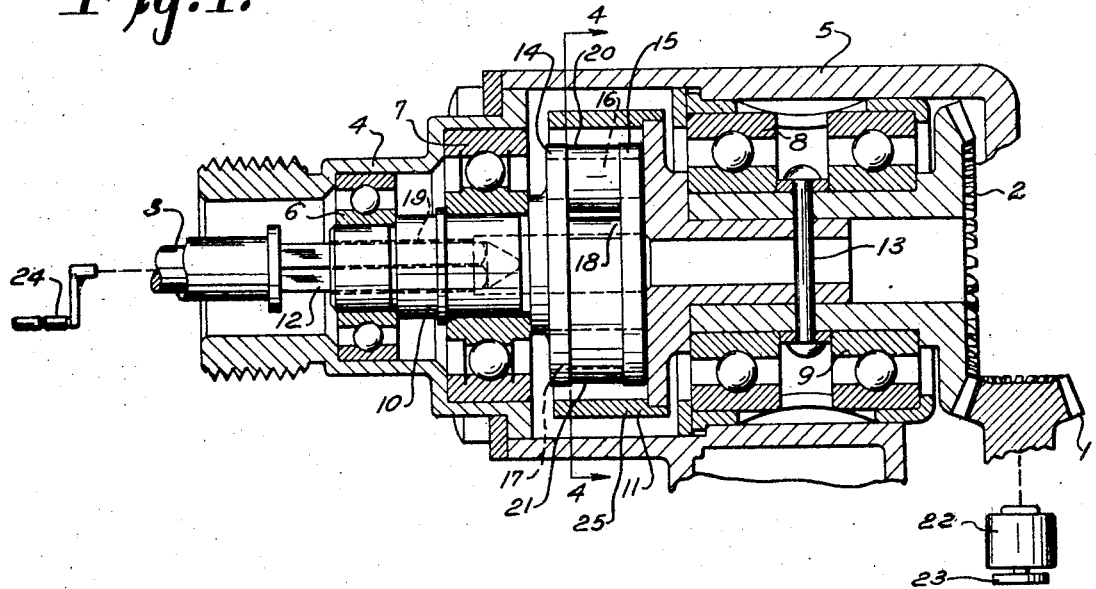
Figure 1 is a longitudinal sectional view through the present clutch mechanism.
Figure 2:
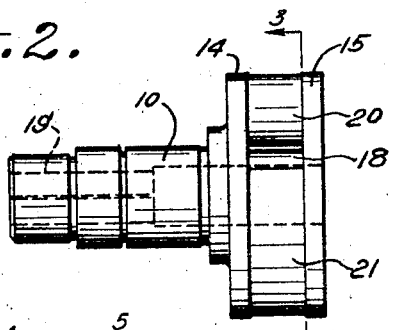
Figure 2 is an elevational view of the driving member.
Figure 3:
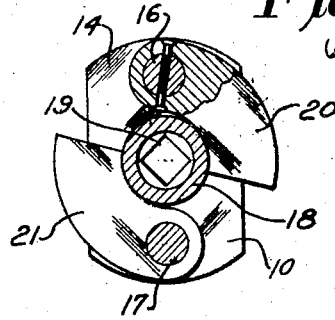
Figure 3 is a section taken on line 3—3 of Figure 2.
Figure 4:
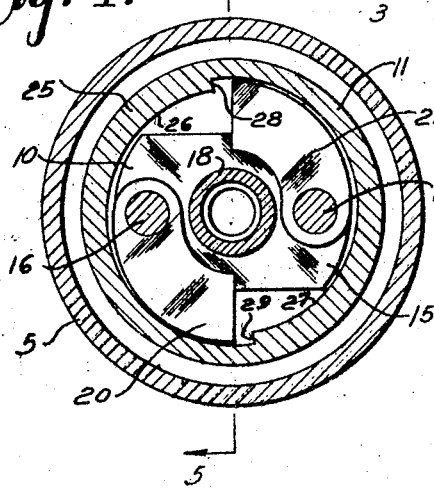
Figure 4 is a section taken on the line 4—4 of Figure 1, the shaft being rotated 90° from the position shown in Figure 1.
Figure 5:
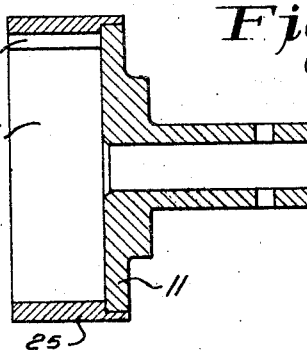
Figure 5 is a sectional view of the driven member, taken on the line 5—5 of Figure 4.

The present invention is particularly adapted for use with hand cranking mechanism associated with an electric starter on airplane engines or the like. The bevel gear 1, shown in mesh with the bevel gear 2, is connected with an electric motor 22 adapted to impart high speed rotation to an inertia flywheel 23. A flexible shaft 3 is connected with a hand crank mechanism indicated generally by the numeral 24. It is desirable that the rotation of the shaft 3 in one direction be transmitted to the gears 1 and 2 to rotate the inertia flywheel by hand power, while at the same time preventing the rotation of the shaft 3 by means of the motor 22. Two housing parts 4 and 5 contain suitable bearings 6, 7, 8, 9 for rotatably carrying a driving member 10 and a driven member 11, respectively. Driving member 10 is provided with a squared hole 19 for receiving the end of squared extension 12 on the shaft 3. Driving connection may be established between the driven member 11 and the bevel gear 2 by means of a pin 13 or the like. The driving member 10 includes a pair of spaced plates 14 and 15 joined by pins 16 and 17 and a hollow central member 18. Dogs 20 and 21 are mounted for free pivotal action upon the pins 16 and 17.

The driven member 11 is provided with a cylindrical portion 25 containing inner cam surfaces 26 and 27 joined by the steps, or stops, 28 and 29. When the mechanism is assembled, that portion of the driving member including the plates 14 and 15 and the dogs 20 and 21 is adapted to be housed within the cylindrical portion 25 of the driven member 11.

The arrangement of the parts is such that when the driving shaft 3 is rotated in the proper direction the dogs 20 and 21 will engage the stops 28 and 29 to rotate the driven member 11 and spin the inertia flywheel 23 in the same direction as it would be spun by the motor 22. If the shaft 3 is rotated in the reverse direction the dogs 20 and 21 will ride over the cam surfaces 26 and 27 without driving the member 11. When the starting mechanism is operated by the electric motor 22 the direction of rotation of the driven member 11 will be such that the surface 26 and 27 will cam the dogs 20 and 21 inwardly without transmitting rotation to the hand crank shaft 3.

It will be apparent to those skilled in the art that many changes may be made in the above construction without departing from the spirit and scope of the invention, and it is therefore intended that the above description and accompanying drawing shall be considered as illustrative and not in a limiting sense. The invention is to be limited only by the prior art and the scope of the appended claims.

I claim:

1. A clutch mechanism comprising a two part housing, one of said parts carrying a driving member for rotation therein, the other part carrying a driven member for rotation therein, said driving member comprising a pair of spaced plates, a plurality of pivots interconnecting said plates, dogs on said pivots between said plates, said driven member having a cylindrical portion with cam and step interior surfaces, and means for securing said two parts of said housing together with said plates and said dogs contained within said cylindrical portion whereby said driving member is capable of rotating said driven member in one direction only and said driven member is incapable of rotating said driving member in said direction.

2. A one way clutch mechanism comprising a first housing part, spaced bearings in said part, a driving member shaft carried in said bearings, a plate on the end of said shaft, a plurality of pins on said plate, a second plate fixedly mounted on said pins, dogs pivotally mounted on said pins between said plates; a second housing part, spaced bearings in said second housing part, a driven member shaft carried in said bearings, a cylindrical portion on an end of said shaft having cam and step interior surfaces for one way rotational engagement with said dogs, and means for removably securing said two housing parts together with said plates and said dogs contained within said cylindrical portion of said driven member.

3. A one way clutch mechanism comprising a separable two part housing, each of said housing parts containing spaced bearings, a driving member with centrifugal dogs carried in the bearings in one of said parts, and a driven member adapted for rotational engagement by said dogs carried in the bearings in the other of said housing parts, the arrangement being such that when the two housing parts are secured together the driving and driven members are held in cooperating relation, whereby said clutch mechanism functions additionally as a shaft coupling device.

RALPH M. HEINTZ.